United States Patent

Lieberman et al.

[11] Patent Number: 6,102,556
[45] Date of Patent: Aug. 15, 2000

[54] DETACHABLE LIGHT FILTER HOLDER

[75] Inventors: Larry Lieberman, Hartsdale, N.Y.; John Fuller, Burbank, Calif.

[73] Assignee: Panavision, Inc., Woodland Hills, Calif.

[21] Appl. No.: 09/063,710

[22] Filed: Apr. 21, 1998

[51] Int. Cl.⁷ ................................. F21V 17/00; F21V 9/00
[52] U.S. Cl. ........................... 362/433; 362/16; 362/293; 359/892
[58] Field of Search ................................. 362/16, 18, 293, 362/433, 440, 444, 445, 455, 456, 374; 359/818, 827, 892, 817, 819, 885; 396/71, 544

[56] References Cited

U.S. PATENT DOCUMENTS

| | | | |
|---|---|---|---|
| 1,228,389 | 6/1917 | Barnes | 359/892 |
| 1,283,963 | 11/1918 | Takahashi | 359/892 |
| 1,829,867 | 12/1931 | Koster | 359/892 |
| 2,260,712 | 10/1941 | Harrison | 359/892 |
| 2,668,469 | 2/1954 | Gabel | 359/819 |
| 3,758,200 | 9/1973 | Saito | 359/892 |
| 4,129,898 | 12/1978 | Ohrstedt | 362/18 |
| 5,359,380 | 10/1994 | Mathias | 396/544 |
| 5,768,649 | 6/1998 | Pearson | 359/819 |
| 5,772,355 | 6/1998 | Ross et al. | 359/818 |

FOREIGN PATENT DOCUMENTS

| | | | |
|---|---|---|---|
| 250083 | 5/1948 | Switzerland | 359/892 |
| 596003 | 12/1947 | United Kingdom | 359/892 |

*Primary Examiner*—Alan Cariaso
*Attorney, Agent, or Firm*—Lyon & Lyon LLP

[57] ABSTRACT

A detachable filter holder for receiving interchangeable light filters includes mounting means protruding from a holder body. An elastomeric, adjustable attachment means is disposed about the mounting means in order to detachably mount the filter holder onto a light source, a reflector surrounding the light source, or a camera lens. In two embodiments, the mounting means includes a first leg and an opposing second leg. Preferably, each leg has an inclined surface or a flange for maintaining the adjustable attachment means in its compressive disposition. In another embodiment, the mounting means includes a plurality of rods whereon the adjustable attachment means may be selectively secured.

31 Claims, 7 Drawing Sheets

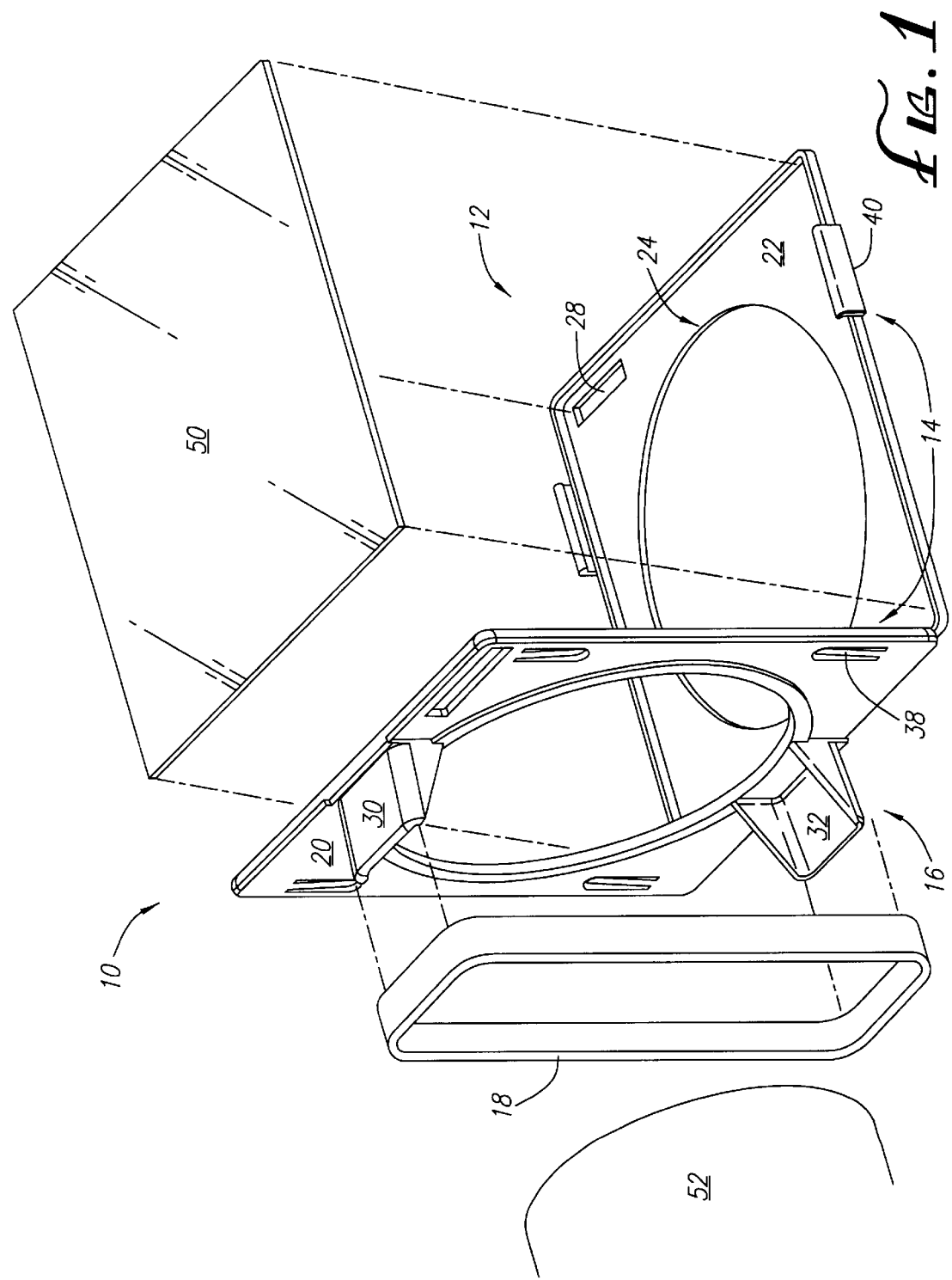

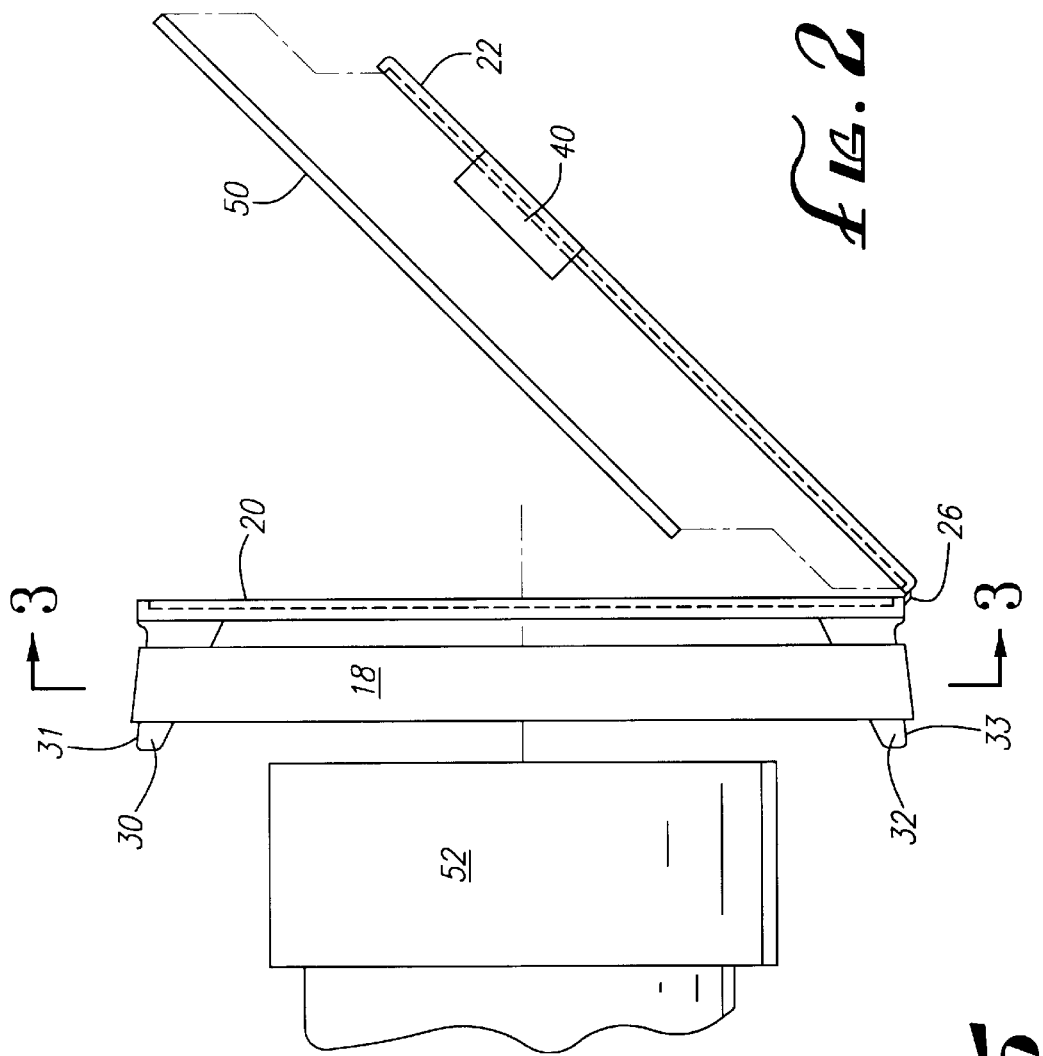
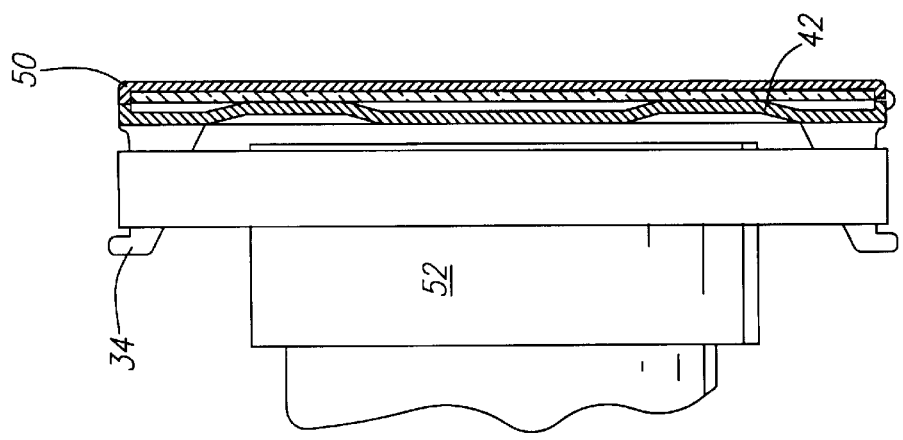

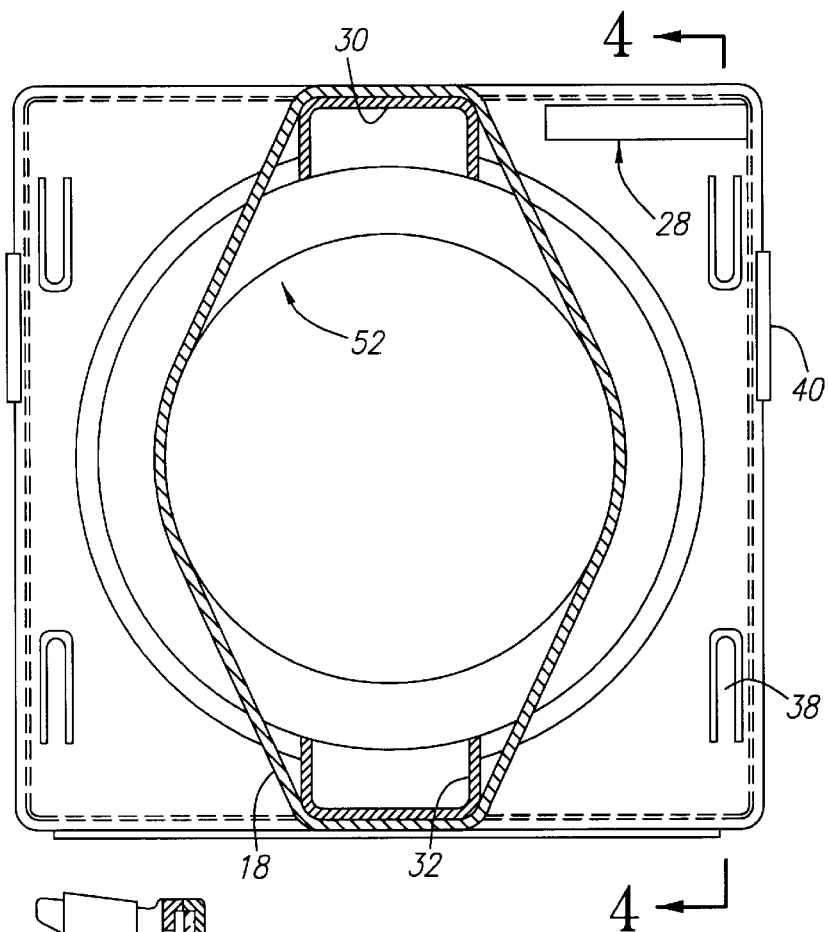
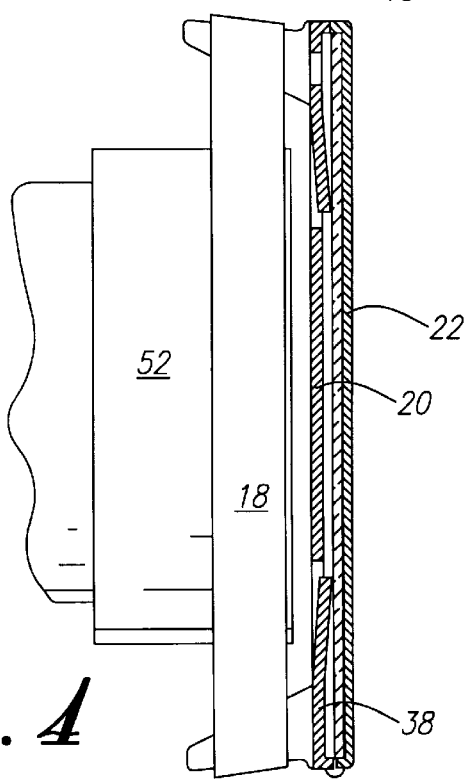

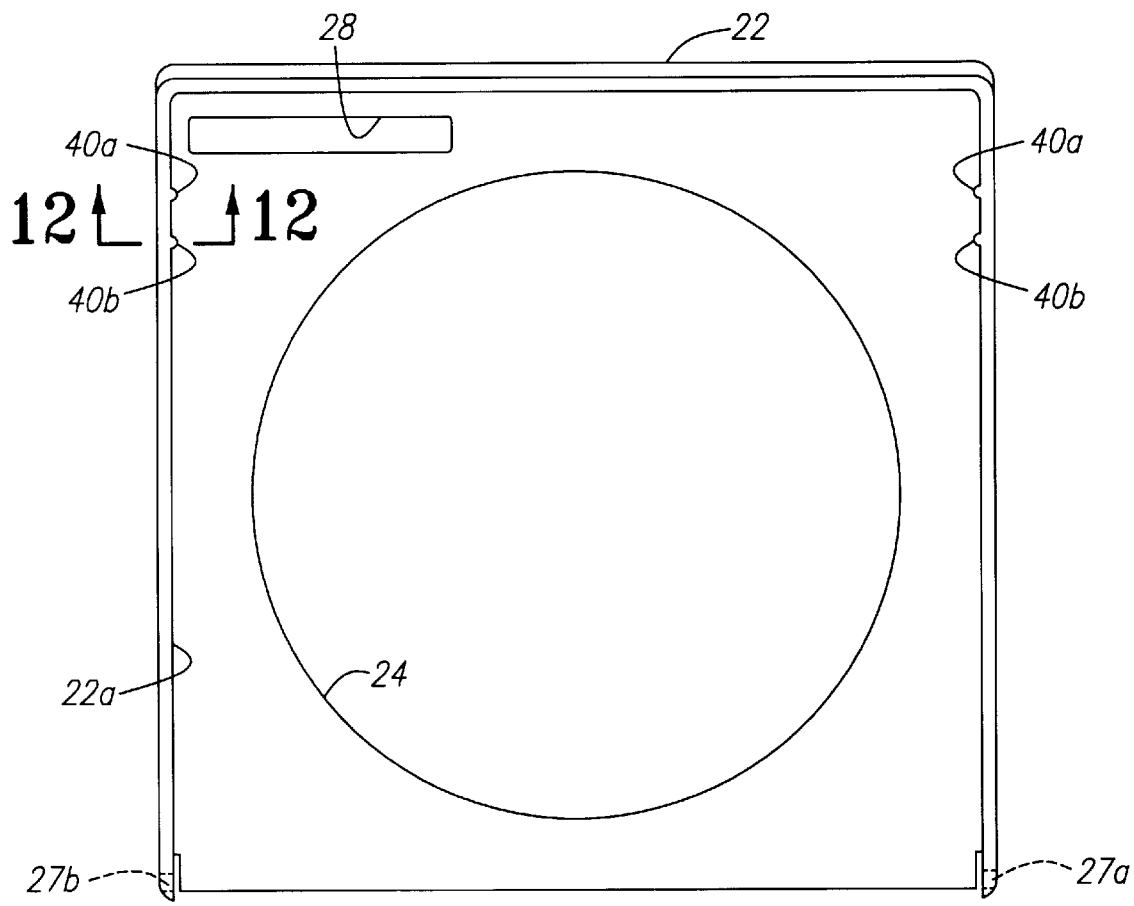
_fig.11_
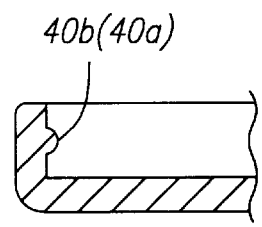
_fig.12_

DETACHABLE LIGHT FILTER HOLDER

BACKGROUND OF THE INVENTION

The field of the present invention generally relates to light filter holders.

Photographers often desire to manipulate the light source that illuminates their subject or the light that enters into the camera lens to enhance the overall photographic image. One of the most commonly employed techniques for accomplishing such enhancement involves the use of filters.

One type of filter used on cameras is a circular disk of glass or optical plastic of the desired color or filtering characteristics that is permanently mounted in a circular metal ring that has threads for threadedly attaching to the front rim of the camera lens. Such filters are expensive and a separate ring-mounted filter is required for each color, tint or other filtering characteristic.

Another type of filter is a so-called gelatin filter which is a relatively inexpensive sheet of plastic of the desired color or filtering characteristics. Filter holders are used to maintain the gelatin filter proximate the light source or the camera lens. Relative to cameras, heretofore the typical gelatin filter holder has some type of frame or support member which has to be specially mounted onto the camera. A rectangular filter plate is then inserted into this support member in order to interchange the filters as desired. Such an arrangement is expensive. If the camera when purchased did not have this specially mounted support member affixed thereto, the retrofit is considerably more expensive. In addition, the mounting of such an arrangement is time consuming. Accordingly, a readily detachable and inexpensive light filter holder solving the aforementioned problems is desired.

SUMMARY OF THE INVENTION

The present invention is directed to a detachable filter holder preferably employing an elastomeric, adjustable attachment means disposed about mounting means protruding from a holder body. The adjustable attachment means allows a user to detachably mount the filter holder to any light source, any reflector Surrounding the light source, or any camera lens. The mounting means may be legs, with or without flanges, or rods. Front and rear walls each having a central aperture and a viewing slot may be separate with hinge members or connected together by a live hinge to define the holder body. By separating the front and rear walls or hinging them open, the user may interchange filters as desired. The filters themselves are secured within the holder body by a filter retaining means.

Accordingly, it is an object of the present invention to provide a filter holder which can be detachably mounted to any light source, reflector surrounding the light source, or camera lens. Other and further objects and advantages of the present invention will be further understood and appreciated by those skilled in the art by reference to the following specification, claims, and annexed drawings.

BRIEF DESCRIPTION OF THE DRAWINGS

FIG. 1 is an exploded, environmental perspective view of one embodiment of the present invention;

FIG. 2 is a side elevation view of the detachable filter holder shown in FIG. 1 adjacent a camera lens on which the filter is adapted to be mounted;

FIG. 3 is a cross-sectional view taken along the line 3—3 of FIG. 2;

FIG. 4 is a cross-sectional view taken along the line 4—4 of FIG. 3;

FIG. 5 is an environmental, cross-sectional view similar to FIG. 4 but showing a second embodiment of the present invention;

FIG. 10 is an enlarged, fragmentary cross-sectional view taken along the line 10—10 of FIG. 8;

FIG. 11 is an elevation view of a back wall of the fourth embodiment of the filter shown in FIG. 7 taken along the line 11—11 of FIG. 7; and FIG. 12 is an enlarged, fragmentary cross-sectional view taken along the line 12—12 of FIG. 11.

Similar reference characters denote corresponding features consistently throughout the attached drawings.

DETAILED DESCRIPTION OF THE PREFERRED EMBODIMENT

Figure 6:
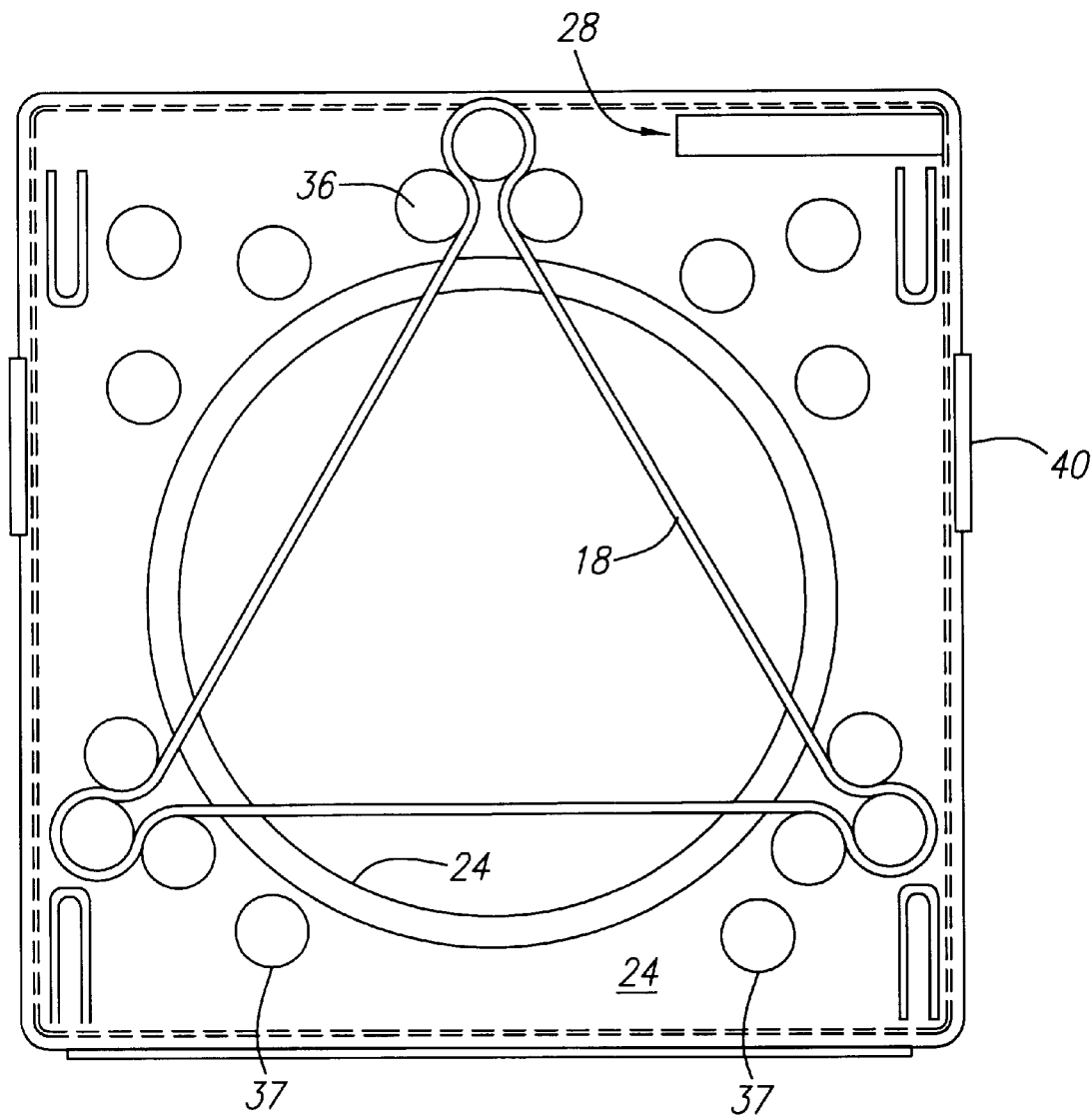
FIG. 6 is an environmental, cross-sectional view similar to FIG. 3 but showing a third embodiment of the present invention.
Figure 7:
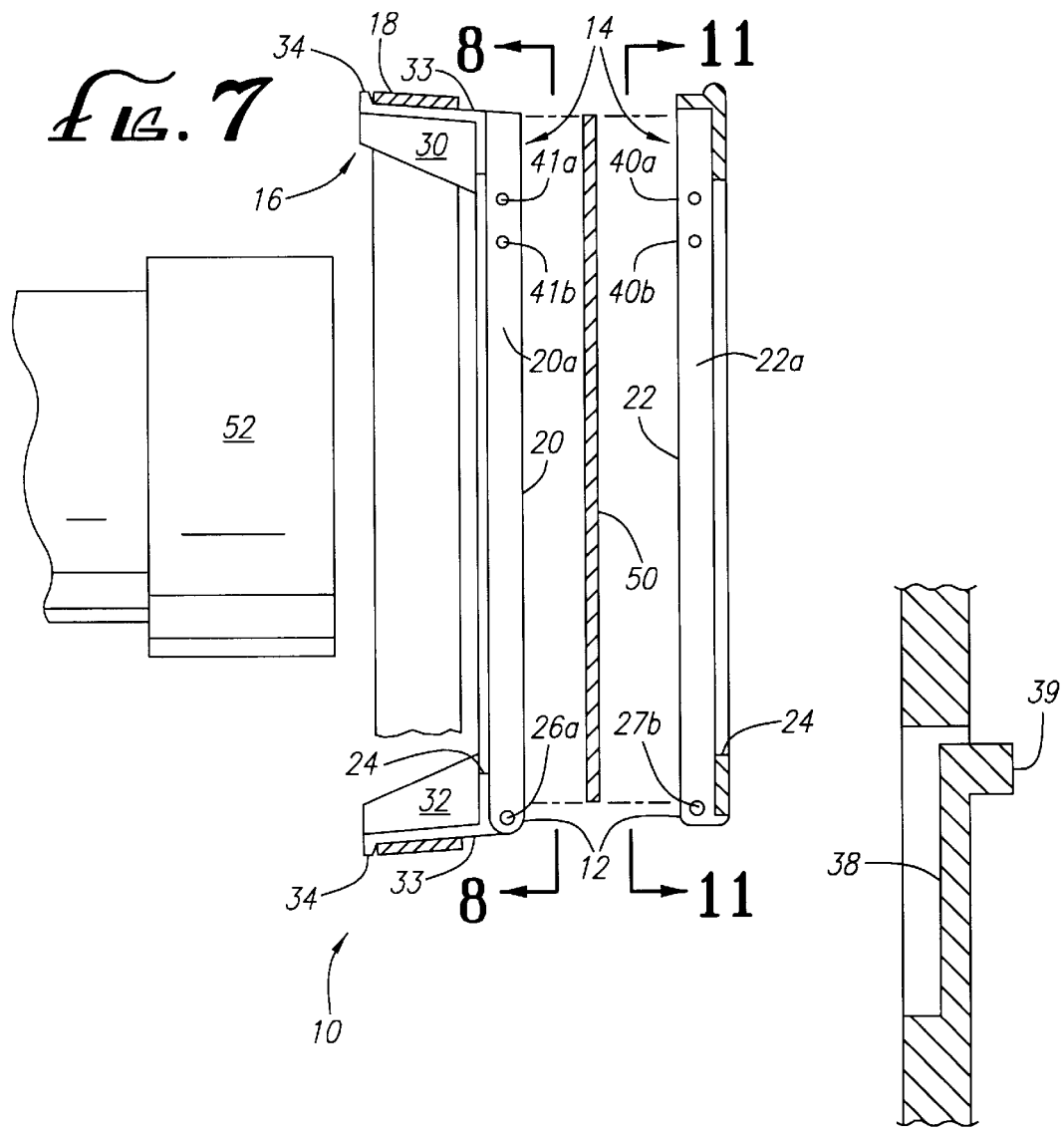
FIG. 7 is a side elevation view with portions shown in cross-section of a fourth embodiment of the filter holder of the present invention.
Figure 8:
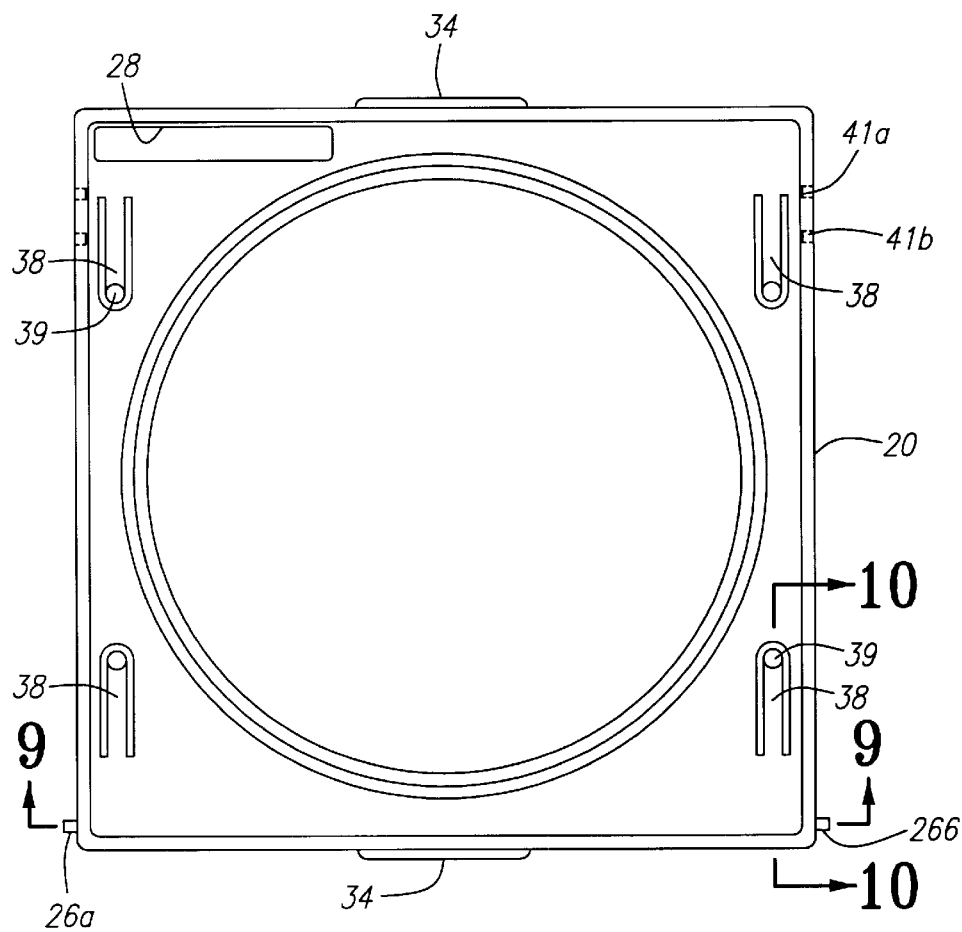
FIG. 8 is an elevation view of a front wall of the fourth embodiment of the filter holder shown in FIG. 7 taken along the line 8—8 of FIG. 7.
Figure 9:
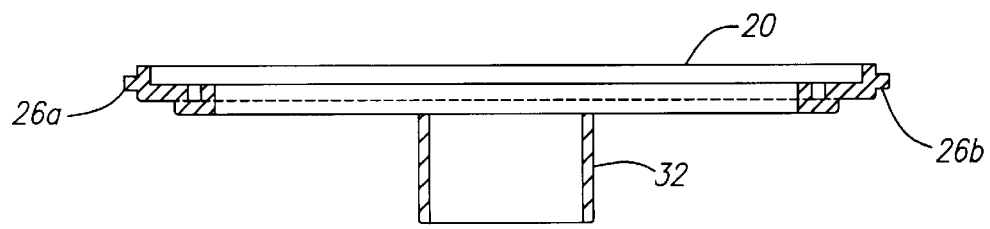
FIG. 9 is a cross-sectional view taken along the line 9—9 of FIG. 8.

Turning in detail to the drawings, a detachable filter holder 10 is illustrated in four embodiments. FIGS. 1–4 illustrate the first embodiment, FIGS. 5 and 6 illustrate the second and third embodiments, respectively, and FIGS. 7–12 illustrate the fourth embodiment. Regardless of the embodiment, each detachable filter holder 10 includes a holder body 12, filter retaining means 14 located in the holder body 12, mounting means 16 protruding from the holder body 12, and adjustable attachment means 18 disposed about the mounting means 16.

The holder body 12 has a front wall 20 and an opposing rear wall 22. The front wall 20 and rear wall 22 are pivotally connected together for opening and closing such that a photographer may selectively interchange a filter 50 with ease. Preferably, the connection is a live hinge 26; however, a rod and sleeve arrangement, pivot pins and holes or the like may be employed. The size of the holder body 12 may vary for different diameters of lenses, as will appear more fully hereinafter, but for a given range of lens diameters, the same size holder body 12 may be used. The filter 50 may be of the relatively inexpensive gelatin type. The size of the filter 50 itself will vary depending on the size of the holder body 12, but the holder body 12 is constructed to accommodate the filter 50 whether the filter 50 is framed (approximately 2 millimeters thick) or unframed (approximately 0.010 millimeters thick). For a conventional 35 mm camera with replaceable lenses, the holder body 12 is preferably about 100 millimeters square with walls about 0.060 millimeters thick. The entire filter holder 10 can be made of injection molded plastic, thereby reducing manufacturing costs.

Each wall 20, 22 of the holder body 12 has a central aperture 24. Where the holder body 12 is detachably mounted to a light source or a reflector surrounding the light source, the aperture enables the light to enter and exit the filter 50. Relative to a camera lens 52, the aperture 24 permits light to enter the camera lens 52 after it has been filtered. Preferably, the aperture 24 is circular to be compatible with that of a camera lens diameter. The holder body 12 of 100 millimeters square is designed to receive a camera lens diameter from about 49 millimeters to 82 millimeters.

In a separate aspect of the invention, one or both walls 20, 22 includes a viewing slot 28. The viewing slot 28 enables a photographer to read the label on the filter 50 to determine the exact type of filter 50 secured within the holder body 12.

The filter retaining means 14 is located on the holder body 12 at the front and rear walls 20, 22. The filter retaining means 14 is designed to securely contain the filter 50 within the holder body 12. As seen in FIG. 1, one aspect of the filter retaining means 14 includes a leaf spring and clip arrangement. The plural leaf springs 38 are integrally formed and arranged symmetrically, one in each corner of the front wall 20. Two clips 40 are disposed on the rear wall 22. The leaf springs 38 provide a biasing force to firmly hold the filter 50 in place within the holder body 12 and to accommodate different filters of varying thickness. The clips 40 latch over the edge of the front wall 20 to keep the holder body 12 closed once the filter 50 is securely positioned therein.

The mounting means 16 protrudes from the front wall 20 of the holder body 12. As seen in FIGS. 1–4, the first embodiment illustrates the mounting means 16 as having a first leg 30 and an opposing second leg 32 disposed on the edges of the front wall 20. Preferably, the legs 30, 32 are of a U-shaped cross-section, as shown in FIG. 3, with the oppositely facing upper and lower surfaces 31, 33 of legs 30, 32, respectively inclined away from each other for retaining the adjustable attachment means 18 thereon.

The adjustable attachment means 18 is disposed about the mounting means 16 for detachably mounting the holder body 12 to the light source, a reflector surrounding the light source, or the camera lens 52. The adjustable attachment means 18 can be made of an inelastic material such as adhesive strip, Velcro strip, metal wire or string; however, it is preferably an elastomeric material such as a rubber band, as shown in the drawings. This is because most inelastic materials would have to be manually tied around the mounting means 16 and the lens 52, thereby decreasing efficiency. As shown in FIG. 1, the rubber band attachment means 18 encircles the legs 30, 32 and, as shown in FIG. 3, the rubber band 18 is expanded laterally by the camera lens 52 and frictionally grips the camera lens 52 for retaining the filter holder 10 in the desired position on the lens.

Referring to FIG. 5, the second embodiment includes a filter retaining means 14 having plural pillow springs 42 rather than leaf springs 38. Similar to the leaf springs 38, the pillow springs 42 are symmetrically disposed on each corner of the front wall 20. The pillow springs 42 are semicircular molded plastic which provide a biasing force to maintain the disposition of the filter 50 within the holder body 12. Also, the second embodiment of FIG. 5 includes a flange 34 on legs 30, 32 for retaining the adjustable attachment means 18 on the legs 30, 32 rather than the inclined surfaces 31, 33 illustrated in the first embodiment. In all other respects, the first and second embodiments may be the same.

As alternatives to the two clips 40 illustrated and described with respect to the first and second embodiments for retaining the walls 20, 22 in the closed position, a snap-type latch, a peg-in-a-hole type latch or the like may be provided.

FIG. 6 illustrates a third embodiment of the mounting means 16. A plurality of rods 36 projects perpendicularly from the front wall 20. These rods 36 may be arranged in five groups of three with two additional, opposing rods 37, as shown. This design permits the photographer to securely engage varying camera lens diameters. In all other respects, the first and third embodiments may be the same.

Referring now to FIGS. 7–12 illustrating a fourth embodiment, which is similar to the first embodiment, the holder body 12 has a front wall 20 and an opposing rear wall 22. The front wall 20 and rear wall 22 are pivotally connected together for opening and closing such that a photographer may selectively interchange a filter 50 with ease. Unlike the live hinge 26 of the first and second embodiments, the walls 20, 22 of the fourth embodiment are separate and hinged together by a pair of pins 26a and 26b on front wall 20 that engage a pair of holes 27a and 27b, respectively, on rear wall 22 to form a hinge connection between the walls 20 and 22. The fourth embodiment also differs in the form of means (clip 40 in the first embodiment) for retaining the wall 20 and 22 in the closed position. Specifically, the fourth embodiment includes a pair of projections 40a and 40b on the interior of opposing edge walls 22a of rear wall 22 that are adapted to engage a corresponding pair of detent holes or depressions 41a and 41b on the exterior of opposing edge walls 20a of front wall 20, with edge walls 22a fitting within and opposing edge walls 20a. Finally, the four embodiment differs in having a flat-ended projection 39 on each of the leaf springs 38 for engaging and resiliently clamping the filter 50 in position when the walls 20, 22 are closed. In all other respects the fourth embodiment is substantially the same as the first and second embodiments. The front and rear walls 20, 22 of filter holder 10 of the fourth embodiment can be made of injection molded plastic separately in smaller molds than the first and second embodiments, thereby further simplifying and reducing the cost of manufacturing.

In use, the photographer selects the desired filter 50, opens the holder body 12 by unclipping or unsnapping the rear wall 22 from the front wall 20, places the filter 50 therein, and closes the holder body 12 by clipping or snapping it shut. Relative to the camera, if the adjustable attachment means 18 is inelastic, the photographer will then place the camera lens 52 proximate the front wall circular aperture 24, wrap the adjustable attachment means 18 around the legs 30, 32 or rods 36, and securely tie off the attachment means 18 against the lens 52. If the attachment means 18 is elastic, as preferred, the photographer will merely bias it open before inserting the camera lens 52. As seen in FIG. 3, the opposing leg embodiment enables more surface area of the attachment means 18 to engage the sides of the lens 52 than the rod embodiment with a triangularly arranged attachment means 18 shown in FIG. 6, although the camera lens is not shown.

Thus, a preferred embodiment of an inexpensive and readily detachable filter holder employing an elastomeric attachment means disposed about mounting means protruding from a holder body has been disclosed. The disclosed filter holder is applicable to a variety of lenses and accepts a variety of filters, including relatively inexpensive gelatin filters. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A detachable light filter holder comprising:
   a holder body having an aperture;
   a first leg and an opposing second leg protruding from said holder body, wherein each said leg is U-shaped in cross-section, said first leg having an upper surface, said second leg having an opposing lower surface, said upper surface being inclined away from said lower surface; and
   an adjustable means disposed about said first leg and said second leg for attaching the filter holder to an object.

2. The filter holder of claim 1 wherein each said leg includes a flange.

3. The filter holder of claim 1 further comprising a pillow spring integrated into said holder body.

4. The filter holder of claim 2 further comprising a pillow spring integrated into said holder body.

5. The filter holder of claim 1 further comprising a leaf spring and a clip located on said holder body.

6. The filter holder of claim 1 wherein said holder body includes a viewing slot.

7. The filter holder of claim 1 wherein said holder body includes a live hinge connecting two portions of said holder body.

8. The filter holder of claim 1, wherein said holder body is comprised of a front wall and a separate rear wall, and said front wall and said rear wall having cooperating means forming a hinge connection between said front and rear walls.

9. The filter holder of claim 8, wherein said cooperating means includes a pair of projecting pins in said front wall that are received in a pair of holes in said rear wall.

10. A detachable light filter holder comprising:
    a front wall and an opposing rear wall hingedly connected together, each said wall having a circular aperture;
    filter retaining means integrated into each said wall;
    projection means protruding from said front wall; and
    an elastomeric member disposed about said projection means for detachably mounting the filter holder to an object.

11. The detachable filter holder of claim 10 wherein said projection means includes a first leg and an opposing second leg.

12. The detachable filter holder of claim 11 wherein each said leg includes a flange.

13. The detachable filter holder of claim 10 wherein said projection means includes a plurality of rods.

14. The detachable filter holder of claim 10 wherein said filter retaining means includes a leaf spring integrated into said front wall and a clip integrated into said rear wall.

15. The detachable filter holder of claim 10 wherein said filter retaining means includes a pillow spring integrated into said front wall.

16. The filter holder of claim 15 wherein said projection means includes a first leg and an opposing second leg, each said leg having a flange.

17. The filter holder of claim 14 wherein said projection means includes a first leg and an opposing second leg, wherein each said leg is U-shaped in cross-section, said first leg having an upper surface, said second leg having an opposing lower surface, said upper surface being inclined away from said lower surface.

18. The detachable filter holder of claim 10 wherein each said wall includes a viewing slot.

19. The detachable filter holder of claim 10 wherein said front wall and said rear wall are connected by a live hinge.

20. The filter holder of claim 10, wherein said front wall and said rear wall are hingedly connected by a pair of projecting pins in said front wall that are received in a pair of holes in said rear wall.

21. A detachable filter holder for receiving interchangeable light filters and being detachably mounted on a camera lens comprising:
    a pair of walls including means for allowing opening and closing of said walls to removably receive the light filter between said walls, said walls each having a central aperture for light to pass through said walls and through the light filter;
    at least a pair of projection means extending from one of said walls away from the other of said walls; and
    an adjustable attachment means encircling said projection means and the camera lens for detachably supporting the detachable filter holder on the camera lens.

22. The detachable filter holder of claim 21, wherein said means for allowing opening and closing of said walls includes a hinge connection between said pair of walls.

23. The detachable filter holder of claim 21, wherein said means for allowing opening and closing of said walls includes a latch for releasably connecting said pair of walls.

24. The detachable filter holder of claim 22, wherein said means for allowing opening and closing of said walls includes a latch for releasably connecting said pair of walls.

25. The detachable filter holder of claim 21, wherein said adjustable attachment means comprises an elastic band.

26. The detachable filter holder of claim 25, wherein each said projection means includes means for retaining said adjustable attachment means on said projection means.

27. The detachable filter holder of claim 21, wherein each said projection means includes means for retaining said adjustable attachment means on said projection means.

28. A detachable light filter holder for receiving a light filter and for detachably mounting to any light source, any reflector surrounding the light source, or any camera lens, the light filter holder comprising:
    a pair of walls including means for allowing opening and closing of said walls to removably receive the light filter between said walls, said walls each having a circular aperture for light to pass through said walls and through the light filter;
    a first leg and a second leg each extending away from one of said walls, each said leg being adapted for retaining an attachment member encircling said first leg and said second leg.

29. The filter holder of claim 28, wherein said first leg has an upper surface, said second leg has an opposing lower surface, said upper surface being inclined away from said lower surface for retaining the attachment member encircling said first leg and said second leg.

30. The filter holder of claim 28, wherein each said leg includes a flange for retaining the attachment member encircling said first leg and said second leg.

31. The filter holder of claim 28, wherein each said leg is substantially U-shaped in cross-section.

* * * * *